(12) United States Patent
Guldenfels et al.

(10) Patent No.: US 7,802,676 B2
(45) Date of Patent: Sep. 28, 2010

(54) CONVEYOR BELT MODULE WITH HIGH FRICTION CONVEYING SURFACE

(75) Inventors: Dieter Guldenfels, Pfeffingen (CH); Dietmar Elsner, Eimeldingen (DE)

(73) Assignee: Habasit AG, Reinach (CH)

( * ) Notice: Subject to any disclaimer, the term of this patent is extended or adjusted under 35 U.S.C. 154(b) by 367 days.

(21) Appl. No.: 11/821,413

(22) Filed: Jun. 22, 2007

(65) Prior Publication Data
US 2008/0314720 A1    Dec. 25, 2008

(51) Int. Cl.
  *B65G 17/38*    (2006.01)
(52) U.S. Cl. .................. 198/853; 198/688.1; 198/699.1
(58) Field of Classification Search .............. 198/688.1, 198/699.1, 850, 851, 852, 853
See application file for complete search history.

(56) References Cited

U.S. PATENT DOCUMENTS

| 4,438,838 A | * | 3/1984 | Hodlewsky et al. .......... 198/853 |
| 4,832,183 A | | 5/1989 | Lapeyre |
| 4,925,013 A | | 5/1990 | Lapeyre |
| 5,121,831 A | * | 6/1992 | Fesler .......... 198/853 |
| 5,323,893 A | * | 6/1994 | Garbagnati .............. 198/690.2 |
| 5,361,893 A | | 11/1994 | Lapeyre et al. |
| 5,439,097 A | | 8/1995 | Takahashi et al. |
| 5,497,874 A | * | 3/1996 | Layne .......... 198/698 |
| 5,507,383 A | | 4/1996 | Lapyere et al. |
| 5,587,218 A | * | 12/1996 | Betz ............ 428/67 |
| 6,880,696 B2 | * | 4/2005 | Cediel et al. ............. 198/852 |
| 6,948,613 B2 | | 9/2005 | Guldenfels et al. |
| 7,111,725 B2 | * | 9/2006 | Marshall et al. ............. 198/850 |
| 7,222,730 B2 | * | 5/2007 | Garbagnati et al. ......... 198/853 |
| 2004/0112720 A1 | | 6/2004 | Guldenfels et al. |
| 2005/0241923 A1 | | 11/2005 | Garbagnati et al. |

FOREIGN PATENT DOCUMENTS

| EP | 0523810 A1 | 1/1993 |
| EP | 1593616 A1 | 11/2005 |

* cited by examiner

*Primary Examiner*—Douglas A Hess
(74) *Attorney, Agent, or Firm*—Hodgson Russ LLP

(57) ABSTRACT

A belt module having a grid geometry including cavities and ribs associated with an outer surface for attaching a high friction material.

45 Claims, 6 Drawing Sheets

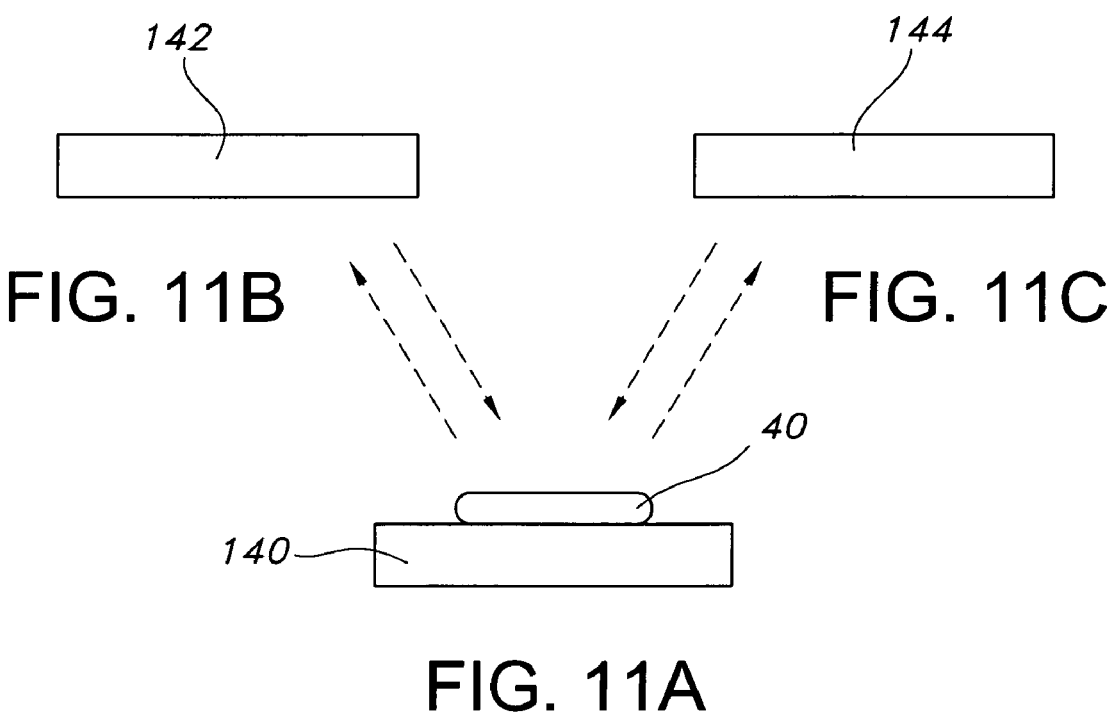

CONVEYOR BELT MODULE WITH HIGH FRICTION CONVEYING SURFACE

FIELD OF THE INVENTION

This invention relates to conveyor belts, and more particularly to modular plastic conveyor belts formed of rows of plastic belt modules pivotally interlinked by transverse pivot rods.

BACKGROUND OF THE INVENTION

Because they do not corrode, are lightweight and are easy to clean, unlike metal conveyor belts, plastic conveyor belts are used widely, especially in conveying food products. Modular plastic conveyor belts are made up of molded plastic modular links, or belt modules, that can be arranged side-by-side in rows of selectable width. A series of spaced apart link ends extending from each side of the modules include aligned apertures to accommodate a pivot rod. The link ends along one end of a row of modules are interconnected with the link ends of an adjacent row. A pivot rod journaled in the aligned apertures of the side-by-side and end-to-end connected modules forms a hinge between adjacent rows. Rows of belt modules are connected together to form an endless conveyor belt capable of articulating about a drive sprocket, and the modules are provided with recesses on the inner surfaces for engaging sprocket teeth.

The belt modules often are provided with a resilient surface, for example a rubber surface, in order to increase friction between the belt and the conveyed goods and thus avoid slipping of the goods. Providing the high friction surface gives rise to the problem of attaching the surface so that it is adequately retained on the module and does not loosen or fall off after repeated use. There have been many attempts at attaching the high friction conveying surface, which typically is an elastomeric or other high friction material, to the belt module, which typically is formed from a rigid plastic material.

One example of such attempts is mechanical retention of the material to the module such as by means of tongue and groove arrangements and fasteners as shown in U.S. Pat. Nos. 4,832,193 and 4,925,013. Another example is integrally molded resilient material such as thermoplastic rubber by co-molding it with the hard plastic module body and providing structures for retaining the rubber mechanically in the module body including channels as disclosed in U.S. Pat. No. 6,948,613 and rivet-like elements as shown in U.S. Pat. No. 5,439,097. A further example is co-molded rubber top modules with rubber recessed into the module and deformed projections that define undercuts to provide mechanical interconnection as described in U.S. Published Patent Application 2005/241,923. Another example is co-molded rubber top modules with rubber thermally bonded to the flat module surface without mechanical retention as shown in U.S. Pat. Nos. 5,361,893 and 5,507,383.

While all of the foregoing approaches have offered some improvements and are widely used, the problem of insufficient retaining of the high friction material such as rubber to the conveyor belt modules still remains. There is no fixing arrangement and method heretofore available which satisfies the objective of providing the best possible and highest available degree of attachment. This is particularly the case for application of rubber to modules made from polyacetal resin material. Due to its very good physical properties and strength, polyacetal is a very common material from which conveyor belt modules are made. However, adhesion of thermoplastic rubber molded to polyacetal is very low. Therefore, there is a definite need for further improvement in retaining high friction resilient material on hard plastic conveyor belt modules.

SUMMARY OF THE INVENTION

This invention addresses the above-described need by providing an improved structure and method for attaching a high friction resilient surface to a conveyor belt module.

BRIEF DESCRIPTION OF THE DRAWINGS

The invention is illustrated in the drawings in which like reference characters designate the same or similar parts throughout the figures of which:

FIGS. 11a, 11b and 11c are diagrammatic views illustrating one form of the method of the invention.

DETAILED DESCRIPTION

Figure 1:
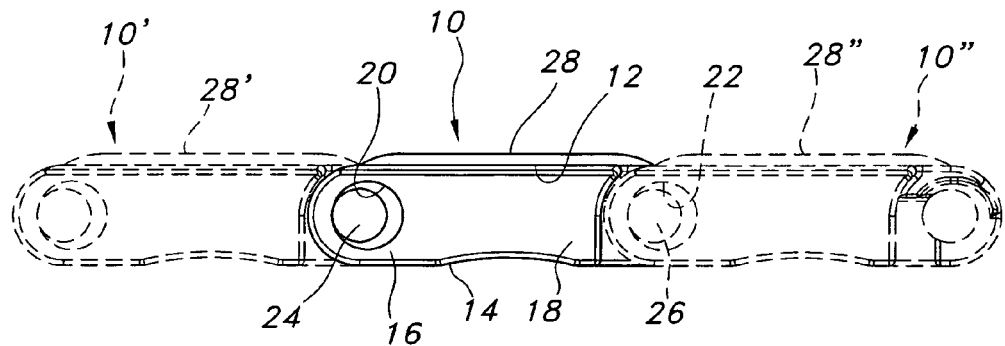
FIG. 1 is a diagrammatic view of a basic belt module for use in a modular conveyor belt.

A basic belt module 10 for use in a modular conveyor belt is shown briefly in FIG. 1. Module 10 comprises a body having an outer surface 12 and an inner surface 14 between oppositely directed link ends 16 and 18 having apertures 20 and 22 respectively. Module 10 typically is molded from plastic material. Modular conveyor belts are made up of a plurality of modules like module 10 arranged side-by-side in rows of selectable width. Apertures 20 and 22 are aligned to accommodate pivot rods 24 and 26 respectively. Rows of belt modules are connected together, i.e. hinged via the pivot rods, to form an endless conveyor belt, and modules 10' and 10" are included in such rows. For a more detailed description of belt modules for use in a modular conveyor belt, reference may be made to U.S. Pat. No. 6,948,613 issued Sep. 27, 2005 entitled "Module With High Friction Conveying Surface", the disclosure of which is hereby incorporated by reference.

The belt modules often are provided with a resilient surface, for example a rubber surface, in order to increase friction between the belt and the conveyed goods and thus avoid slipping of the goods. Such a high friction surface is designated 28 in FIG. 1 for module 10 and 28' and 28" for modules 10' and 10". Providing the high friction gives rise to the problem of attaching the surface so that it is adequately retained on the module and does not loosen or fall off after repeated use. As mentioned hereinabove, there is no fixing arrangement and method heretofore available which satisfies the objective of providing the best possible and highest available degree of attachment, this being particularly the case for application of rubber to modules made from polyacetal resin material.

The invention addresses the foregoing need by providing an improved structure and method for attaching a high friction resilient surface to a conveyor belt module. A molding technique for the plastic module is employed to produce a unique grid geometry on the top, i.e. outer surface, of the module. Cavities in the form of slots or holes are formed from the bottom of the module to its top surface. On the upper portion of the slots, ribs are formed and cross the openings of the slots. In addition, bores are provided into the module from the top surface and include a step defined by a rib crossing a portion of the opening to the bore. All of the foregoing structure, which will be shown and described in detail presently, is provided by the first step of the molding process. In the second step, rubber is molded onto the module, and the rubber flows into the cavities and recesses and flows around and under the portions of the ribs crossing the cavities and recesses in a manner completely surrounding those portions of the ribs. In all those places where the rubber is surrounding a rib of the module, the rubber is permanently and positively retained in position. It cannot be peeled away as can be the case if the rubber is held in position only by adhesion or thermal bonding. Removing the rubber molded by the foregoing method would require tearing the rubber apart and breaking the rubber structure. Thus a very positive retention of the rubber is achieved.

Figure 2:
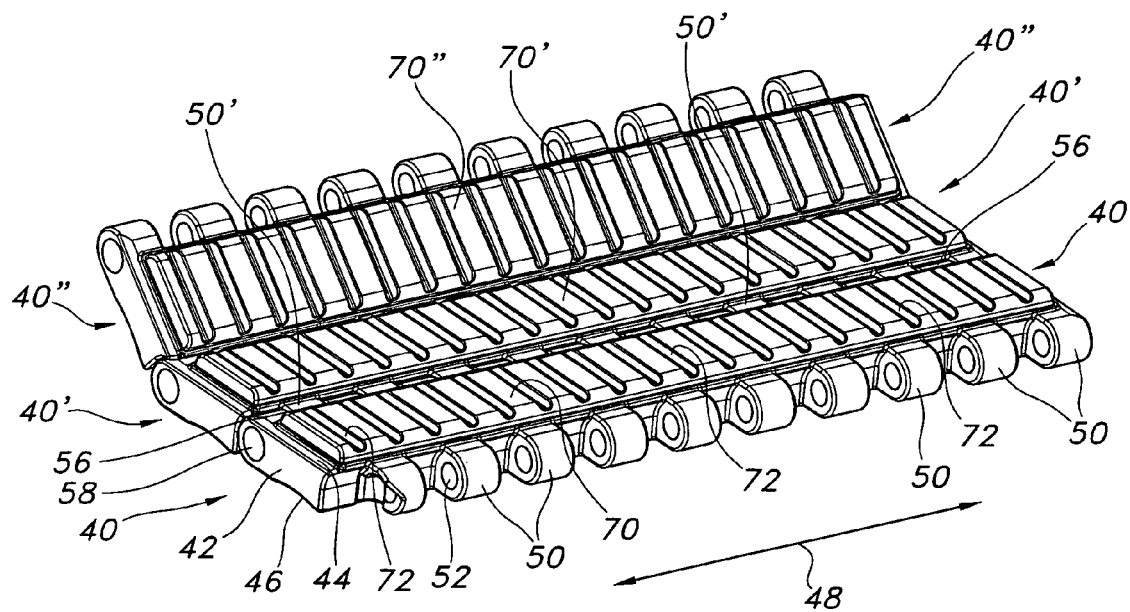
FIG. 2 is a perspective view of an arrangement of modules made according to the method of the invention.

FIG. 2 shows an arrangement of modules manufactured according to the foregoing method. In particular, there are three modules 40, 40' and 40" shown which represent a portion of a conveyor belt, adjacent modules being interconnected, i.e. hinged, by means of the co-operating link ends and pivot rods. Referring to module 40, it includes a body 42 having an outer surface 44, an oppositely disposed inner surface 46 and a longitudinal axis 48 disposed substantially perpendicular to the direction of travel of the conveyor belt in which module 40 is incorporated. A first plurality of link ends 50 extend outwardly from body 42 in a direction of belt travel, and each link end 50 has an aperture 52 for receiving a pivot rod as previously explained. A second plurality of link ends 56 extend in a direction opposite to the first plurality of link ends 50. The second link ends 56 are substantially identical to the first link ends 50 but are offset from the first link ends such that module 40 and an adjacently positioned module 40' are capable of intercalating so that the first link ends of one belt module, i.e. link ends 50' of module 40' fit into spaces defined between the second plurality of link ends of an adjacent module, i.e. link ends 56 of module 40. Modules 40 and 40' are hinged together via a pivot rod 58.

Each of the modules 40, 40' and 40" includes the arrangement of cavities and ribs (not shown in FIG. 2) briefly described hereinabove. Each of the modules 40, 40' and 40" includes the resilient material 70, 70' and 70" such as rubber on the outer surface of the module to provide a frictional article transporting surface on the module. As described briefly hereinabove, the resilient material extends into the cavities and extends around and under portions of the ribs crossing the cavities in a manner completely surrounding those portions of the ribs so that the resilient material is permanently and positively retained in position.

FIG. 2 illustrates one shape or geometry of the article transporting surface provided by the resilient material 70, 70', and 70". The shape of the surface on each module is generally elongated rectangular extending along the module longitudinal axis and for substantially the entire length of the module. Each side of the rectangular article transporting surface is located at or adjacent the junctions between the module body and the link ends. The outer surface of the material 70, 70', 70" can be smooth and continuous or, as illustrated in the example of FIG. 2 can be provided with laterally spaced grooves or recesses 72, 72', 72".

Figure 3:
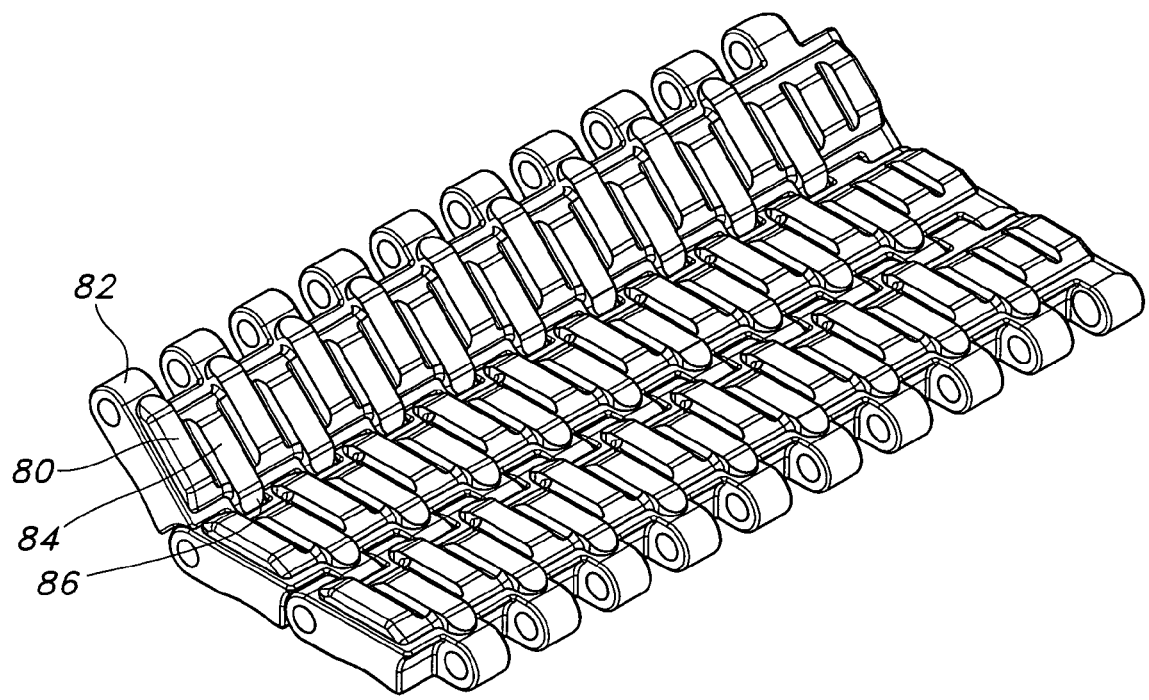
FIG. 3 is a perspective view of an arrangement of modules like that of FIG. 2 but having an alternative surface geometry.

FIG. 3 illustrates an alternative resilient surface geometry in the form of laterally spaced sections aligned with the link ends. Referring to one of the modules in the arrangement of FIG. 3, sections 80 are aligned with the link ends 82 and sections 84 are aligned with the link ends 86. In addition, each of the sections 80 extends onto a portion of the surface of the corresponding one of the link ends 82, and each of the sections 84 extends onto a portion of the corresponding one of the link ends 86.

FIGS. 2 and 3 illustrate examples of the shapes or geometries which can be utilized for the article transporting surface provided by the resilient material. Other shapes or geometries can of course be employed.

Figure 4:
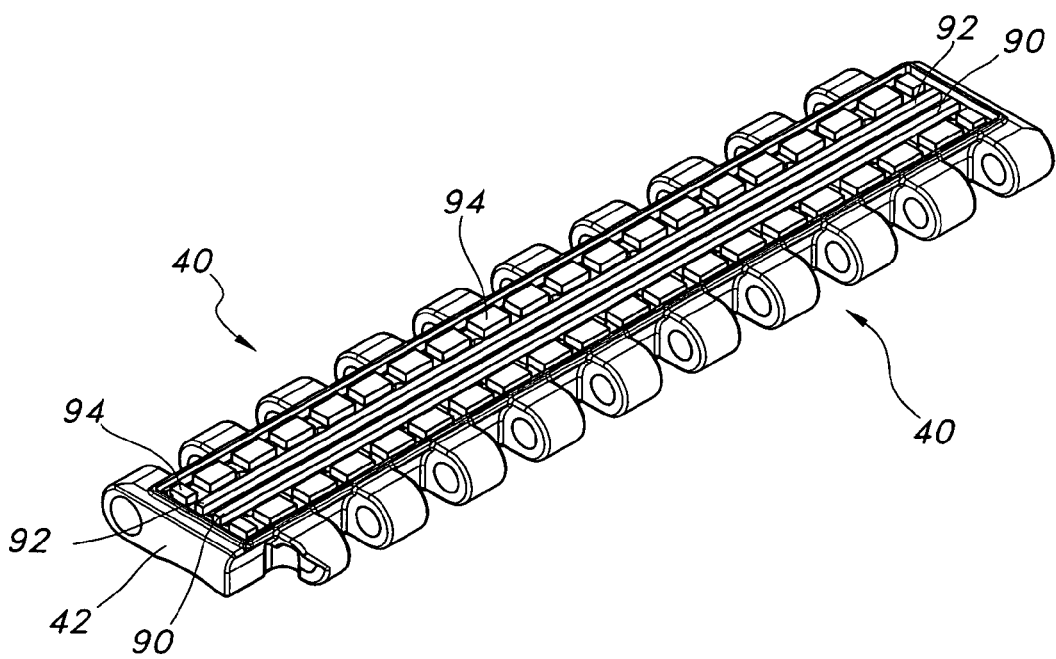
FIG. 4 is a perspective view of a module after the first stage of the method of the invention.

Turning now to FIG. 4 there is shown the module 40, as it would appear after the first stage of the method described hereinabove and before application of the resilient material, i.e. rubber, which is done during the second stage of the method. At least one rib is fixed to the body 42 of the module 40, and in the arrangement illustrated in FIG. 4 there is shown a pair of ribs 90, 92 extending along substantially the entire length of body 42. In this illustrative arrangement, ribs 90, 92 extend across all of the cavities (not shown in FIG. 4) in body 42. Module 40 also is provided with additional ribs 94 which are associated with bores (not shown in FIG. 4) to define the steps mentioned hereinabove and which will be shown and described in detail presently. Optionally, if desired, module 40 can be provided with a peripheral frame or elevated edge 96.

Figure 5:
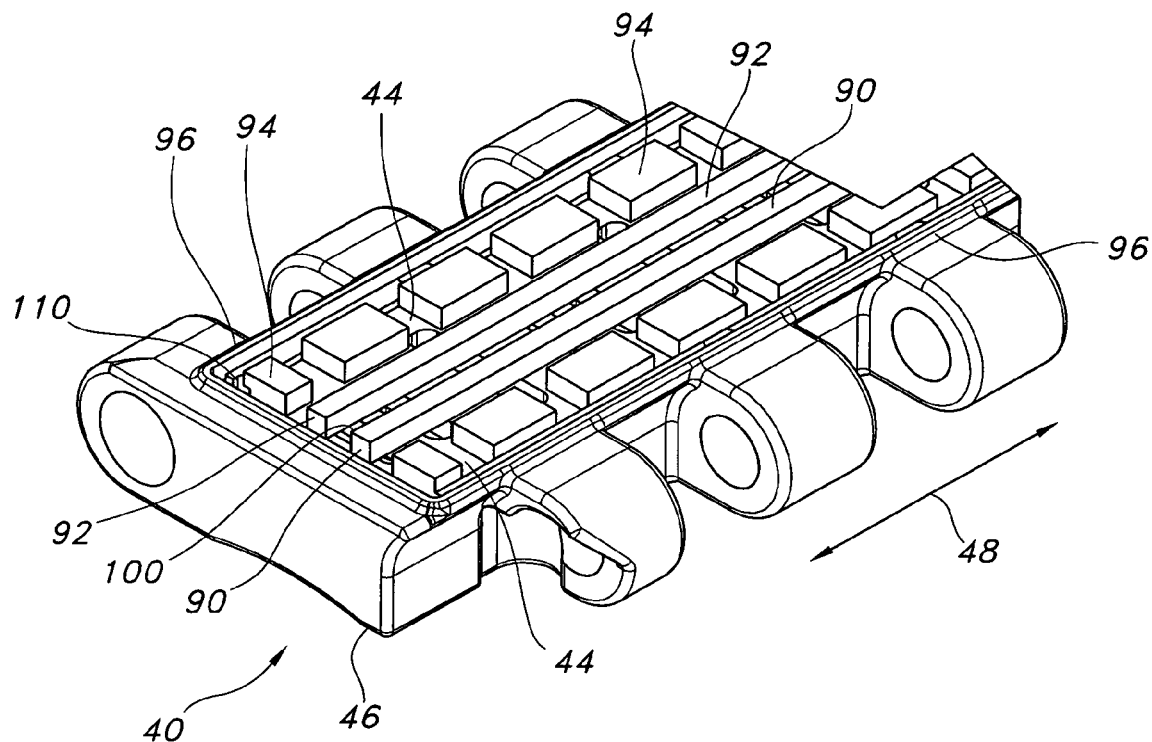
FIG. 5 is an enlarged view of a portion of the module of FIG. 4.

FIG. 5 is an enlarged view of a portion of the length of module 40 of FIG. 4 and which shows the relationship between the ribs and cavities. There is at least one cavity, in the illustrative module shown there is a plurality of cavities 100, each cavity extending from an opening in the outer surface 44 of module 40 toward the module inner surface 46. The plurality of cavities 100 are arranged in spaced relation on the module outer surface 44. Each of the cavities 100 in this module is in the form of an elongated slot extending substantially perpendicular to the longitudinal axis 48 of module 40. As can be seen in FIG. 5 each rib 90, 92 extends across the plurality of openings 100. Each rib 90, 92 extends across a cavity 100 in a manner leaving portions of the opening and the cavity unobstructed and open adjacent opposite sides of the rib. In the illustrative module 40 of FIGS. 4 and 5 including a pair of ribs 90, 92 and including slots 100 spaced along the entire length of module 40, the number of ribs is less then the number of cavities. Module 40 can be provided with at least one additional cavity in the form of a bore 100 extending from the module outer surface 44 toward the module inner surface 46. As will be shown and described in further detail presently, bore 110 and one of the additional ribs 94 cooperate to define a step-like formation.

Figure 6:
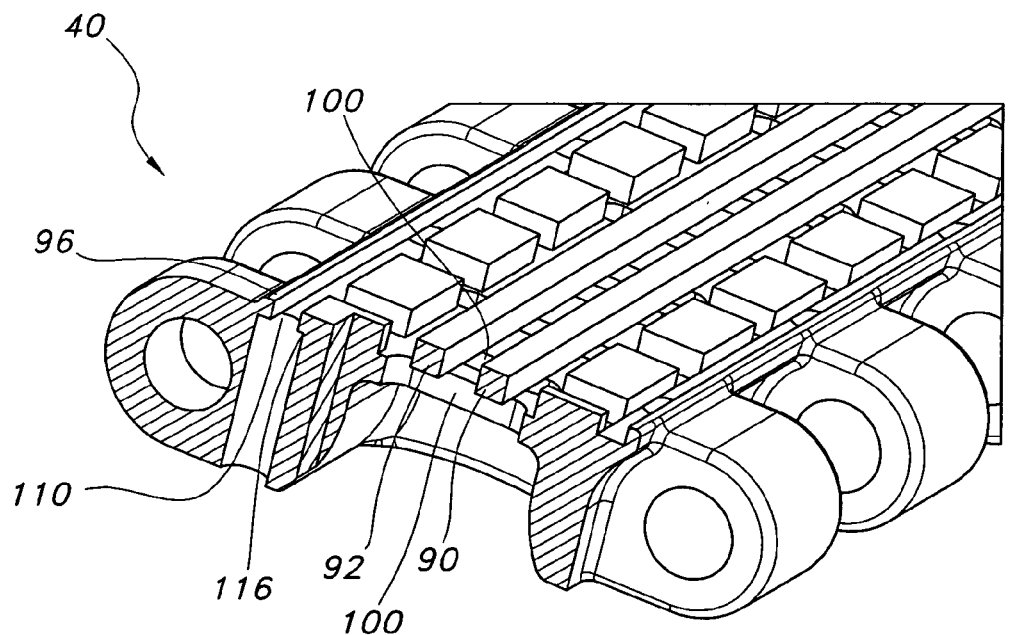
FIG. 6 is a sectional view of the portion of the module shown in FIG. 5.

FIG. 6 is a sectional view of the portion of module 40 shown in FIG. 5. The pair of elongated ribs 90 and 92, the additional ribs 94, the plurality of cavities in the form of elongated slots 100 and the additional cavities in the form of bores 110 are shown in further detail. As previously described, a step-like formation 116 is defined by bore 110 and additional rib 94. Similar step-like formations are associated with the other bores 110 in module 40, three of which bores 110 are shown in FIG. 5.

Figure 7:
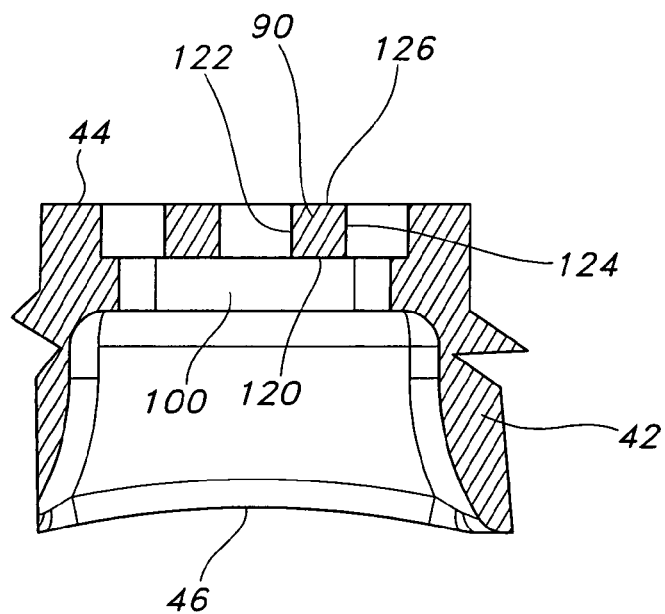
FIG. 7 is a diagrammatic view further illustrating the module of FIG. 6.

The relationship between a rib and cavity is illustrated further by FIG. 7 which is a fragmentary and diagrammatic view of a portion of the structure shown in FIG. 6. FIG. 7 shows the relationship between rib 90 and slot 100. In particular, rib 90 extends in a direction across slot 100 in a manner leaving portions of the opening in module outer surface 44 leading to slot 100 and portions of slot 100 unobstructed or open adjacent opposite sides of rib 90. Rib 90 has an inner surface portion 120 facing generally in the direction of the inner surface of module body 42, a pair of substantially oppositely facing side surface portions 122 and 124 extending from inner surface portion 120, and an outer surface portion 126 between side surface portions 122, 124 and facing generally opposite to the rib inner surface portion 120.

While in the illustrate module shown the rib 90 has a rectangular shaped cross-section, other shapes can of course be employed. For example, in a rib of circular cross-section the inner surface portion would be a first quadrant of the circle facing toward the module inner surface, the side surface portions would be the pair of circle quadrants on opposite sides relative to the first quadrant and facing in opposite directions, and the outer surface portion would be the remaining quadrant of the circle between the above-mentioned pair of quadrants and facing generally opposite the first quadrant. By way of further example, in a rib of triangular cross-section the inner surface portion would be the base of the triangle, the side surface portions would be the sides of the triangle, and the outer surface portion would be the apex of the triangle.

Other rib shapes can of course be employed. The foregoing illustration in FIG. 7 and accompanying description applied to rib 90 is equally applicable to rib 92 and to any additional ribs in the modules which extend across one or more cavities.

Figure 8:
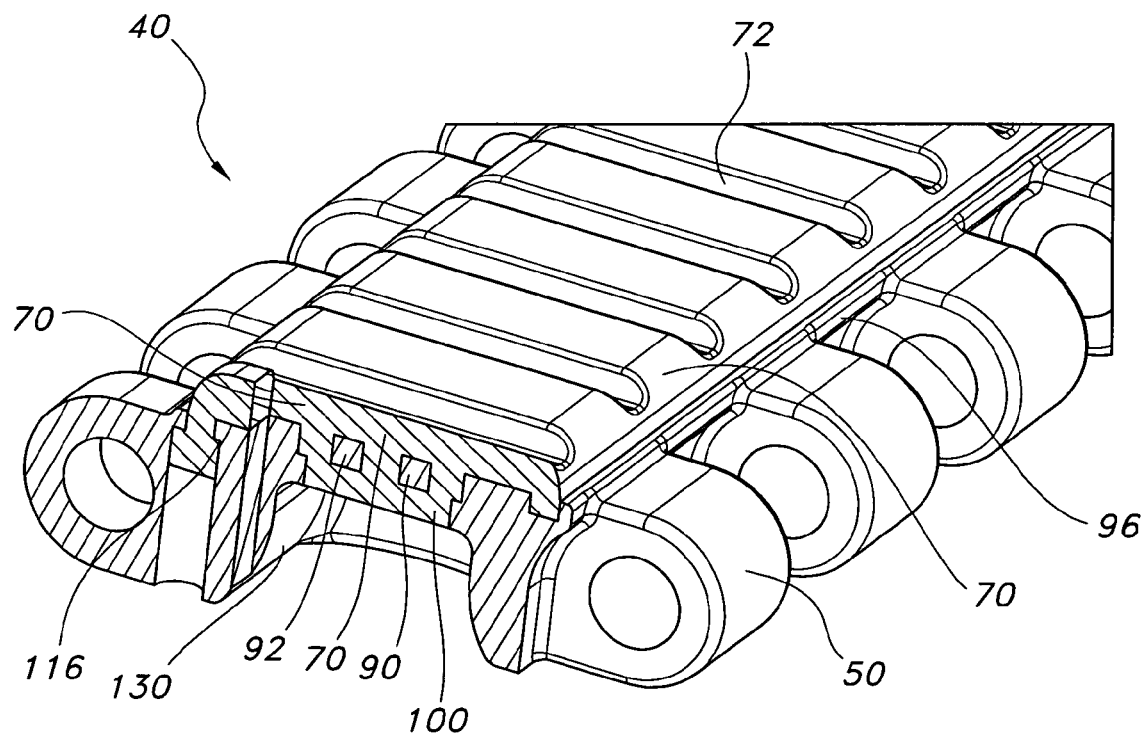
FIG. 8 is a sectional view similar to FIG. 6 and showing the module after the second stage of the method of the invention.

FIG. 8 is a sectional view similar to FIG. 6 and showing module 40 after application of the resilient material 70. The material 70, i.e. rubber, extends into the cavity or slot 100 and engages the rib(s) associated with the cavity, in the present illustration the ribs 90 and 91. FIG. 8 also shows resilient material 70 extending into bore 110 and engaging the step-like formation 116 defined by the additional rib 94.

Figure 9:
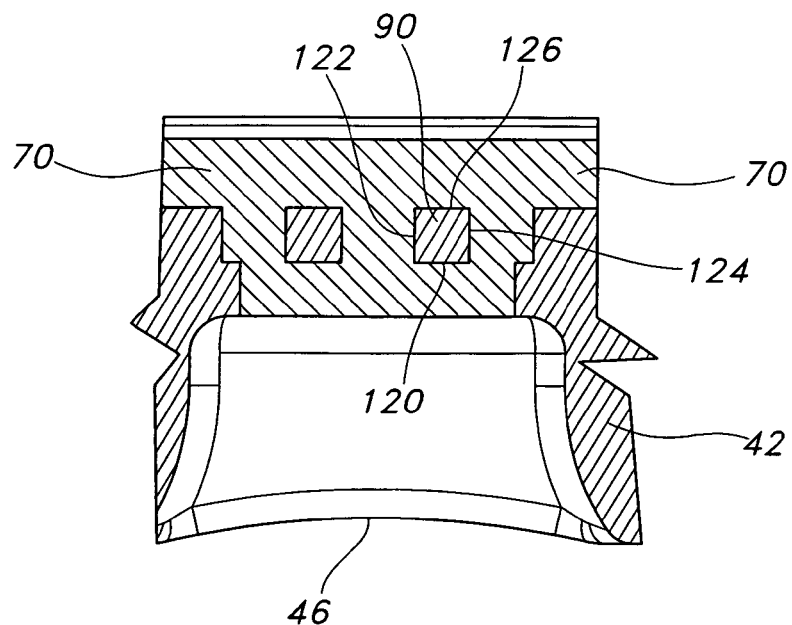
FIG. 9 is a diagrammatic view further illustrating the module of FIG. 8.

The relationship between a rib and the resilient material is further illustrated by FIG. 9 which is a fragmentary and diagrammatic view of a portion of the structure of FIG. 8. FIG. 9 shows the relationship between rib 90 and material 70. In particular, resilient material 70 extends into cavity 100 and on opposite sides of rib 90. The resilient material 70 engages at least the inner surface 120 of rib 90, and in the module shown the material 70 also engages the side surface portions 122, 124 and the outer surface portion 126 or rib 90 so as to surround rib 90. As a result, the resilient material 70, i.e. rubber, is permanently and positively retained in position. The foregoing illustration in FIG. 9 and the accompanying description applied to rib 90 and the surrounding material 70 is equally applicable to rib 92 and material 70 surrounding it and to any additional ribs in the modules which extend across one or more cavities.

Figure 10:
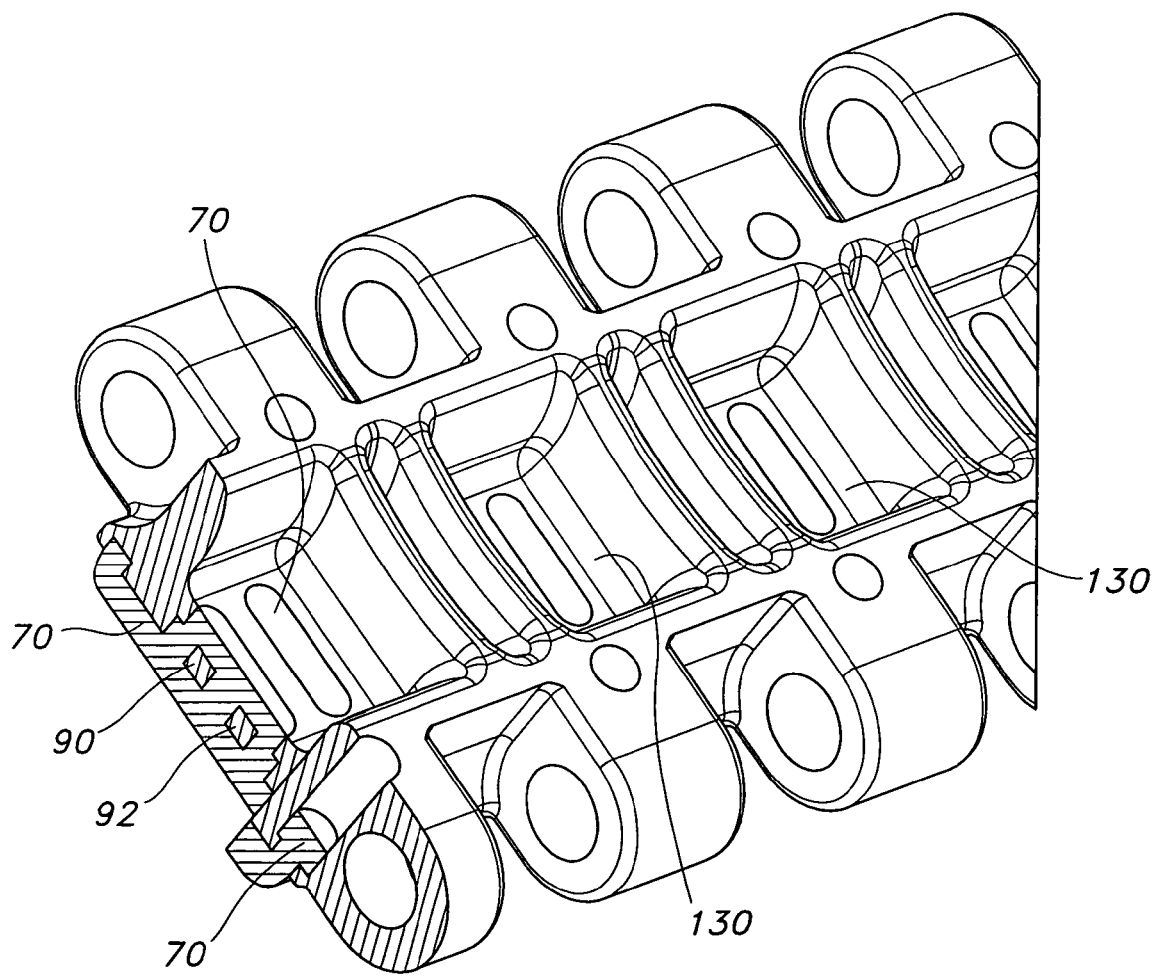
FIG. 10 is an inverted version of FIG. 8 and showing sprocket teeth engaging recesses in the module.

As previously mentioned, rows of belt modules are connected together to form an endless conveyor belt capable of articulating about a drive sprocket, and the modules are provided with recesses on the inner surfaces thereof. FIG. 10 is an inverted version of FIG. 8 and shows a form of recesses 130 provided in the inner surface 46 of module 40 which recesses engage teeth of a conveyor belt drive socket.

The method of the invention advantageously can be performed by co-molding which is a molding technique well understood by those skilled in the art. Briefly, in co-molding two separate molds are used on the same part. FIG. 11a shows diagrammatically module 40 in the lower half 140 of the mold. FIG. 11b shows diagrammatically a first upper mold half 142 which is used in the first stage of the method to form module 40 containing the cavities, ribs and bores as shown in FIGS. 4 and 5. FIG. 11c shows diagrammatically a second upper mold half 144 used in the second stage of the method to form the resilient surface 70 on module 40 as shown in FIG. 8. The foregoing co-molding procedure advantageously saves manufacturing time since after the first stage of the method is completed, module 40 can remain in the mold lower half 140 for operation thereon during the second stage of the method. By way of example, both stages of the method can be performed by injection molding.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention.

What is claimed is:

1. A belt module for use in a modular conveyor belt comprising:
   a) A body having an outer surface and an oppositely disposed inner surface;
   b) A plurality of cavities in the body, each cavity extending from an opening in the outer surface towards the inner surface, the cavity openings being arranged in spaced relation on the outer surface;
   c) A plurality of ribs fixed to the body, each rib being disposed so that it extends across several of the plurality of openings;
   d) Each of the ribs having an inner surface portion facing generally in the direction of the body inner surface, a pair of substantially oppositely facing side surface portions extending from the rib inner surface portion, and an outer surface portion between the rib side surface portions and facing generally opposite to the rib inner surface portion; and
   e) Resilient material on the outer surface of the body to provide a frictional article transporting surface on the module, the resilient material extending into each cavity and engaging the rib associated with that cavity by contacting at least the rib inner surface portion to retain the resilient material on the body.

2. The belt module of claim 1, wherein the number of ribs is less than the number of cavities.

3. The belt module of claim 1, wherein the resilient material contacts also the opposite side portions of the rib.

4. The belt module of claim 3, wherein resilient material contacts also the outer surface portion of the rib so as to surround the rib.

5. The belt module of claim 1, wherein the body is made of thermoplastic material.

6. The belt module of claim 1, wherein the body is made of polyacetal material.

7. The belt module of claim 1, wherein the resilient material is high friction thermoplastic material.

8. The belt module of claim 7, wherein the resilient material is rubber.

9. The belt module of claim 7, wherein the resilient material is polyurethane.

10. The belt module of claim 1, wherein the body has a longitudinal axis disposed substantially perpendicular to the direction of conveyor belt travel, wherein each cavity is in the form of an elongated slot extending substantially perpendicular to the longitudinal axis of the body and wherein each rib is elongated and extends substantially parallel to the longitudinal axis of the body.

11. The belt module of claim 10, wherein the body has a length in the direction of the longitudinal axis and including at least a pair of ribs extending along substantially the entire length of the body so that each rib extends across all of the cavities.

12. The belt module of claim 1, further including a plurality of additional cavities each in the form of a bore extending from the outer surface of the body toward the inner surface of the body and further including a plurality of additional ribs fixed in the body, the additional ribs being located to define a step formation in the bore for engaging the resilient material.

13. The belt module of claim 1, wherein the body includes:
 a) A first plurality of link ends extending outwardly from the body in direction of belt travel; and
 b) A second plurality of link ends extending in a direction opposite to the first plurality of link ends, the second link ends being offset from the first link ends such that adjacently positioned belt modules are capable of intercalating so that the first link ends of one belt module fit into spaces defined between the second plurality of link ends of an adjacent module.

14. The belt module of claim 13, wherein the body is provided with recesses between the first and second plurality of link ends for engagement by sprocket teeth of a conveyor belt drive.

15. A belt module for use in a modular conveyor belt comprising:
 a) A body having an outer surface and an oppositely disposed inner surface;
 b) At least one cavity in the body extending from an opening in the outer surface toward the inner surface;
 c) At least one rib fixed to the body and extending in a direction across the cavity in a manner leaving portions of the opening and the cavity unobstructed adjacent opposite sides of the rib, the rib having an inner surface portion disposed toward the inner surface of the body;
 d) Resilient material on the outer surface of the body to provide a frictional article transporting surface on the module, the resilient material extending into the cavity on opposite sides of the rib and engaging at least the inner surface portion of the rib to retain the resilient material on the body.

16. The belt module of claim 15, wherein the rib has a pair of substantially oppositely facing side surface portions extending from the rib inner surface portion and wherein the resilient material also engages the side surface portions of the rib.

17. The belt module of claim 16, wherein the rib has an outer surface portion between the rib side surface portions and facing generally opposite to the rib inner surface portion and wherein the resilient material also engages the outer surface portion so as to surround the rib.

18. The belt module of claim 15, wherein the body is made of thermoplastic material.

19. The belt module of claim 15, wherein the body is made of polyacetal material.

20. The belt module of claim 15, wherein the resilient material is high friction thermoplastic material.

21. The belt module of claim 20, wherein the resilient material is rubber.

22. The belt module of claim 20, wherein the resilient material is polyurethane.

23. The belt module of claim 15, wherein the body has a longitudinal axis disposed substantially perpendicular to the direction of conveyor belt travel, wherein each cavity is in the form of an elongated slot extending substantially perpendicular to the longitudinal axis of the body and wherein each rib is elongated and extends substantially parallel to the longitudinal axis of the body.

24. The belt module of claim 23, wherein the body has a length in the direction of the longitudinal axis, and including a plurality of cavities in the form of elongated slots in spaced relation along the length of the body, and including at least a pair of ribs each extending along substantially the entire length of the body so that each rib extends across all of the cavities.

25. The belt module of claim 15, further including at least one additional cavity in the form of a bore extending from the outer surface of the body toward the inner surface of the body and further including at least one additional rib fixed in the body, the additional rib being located to define a step information in the bore for engaging the resilient material.

26. The belt module of claim 15, wherein the body includes:
 a) A first plurality of link ends extending outwardly from the body in a direction of belt travel; and
 b) A second plurality of link ends extending in a direction opposite to the first plurality of link ends, the second link ends being offset from the first link ends such that adjacently positioned belt modules are capable of intercalating so that the first link ends of one belt module fit into spaces defined between the second plurality of link ends of an adjacent module.

27. The belt module of claim 26, wherein the body is provided with recesses between the first and second plurality of link ends for engagement by sprocket teeth of a conveyor belt drive.

28. A method for making a belt module for use in a modular conveyor belt comprising:
 a) Providing a body having an outer side surface and an oppositely disposed inner side surface, link ends on opposite ends of the body, at least one cavity extending from an opening in the outer surface towards the inner surface, and at least one rib on the body and extending in a direction across the cavity in a manner leaving portions of the opening and the cavity unobstructed adjacent opposite surfaces of the rib; and
 b) Molding thermoplastic material on the body so that the material provides a frictional article transporting surface on the outer surface of the body and so that the material extends into the cavity and extends about the rib to retain the material on the body.

29. The method of claim 28, wherein the body is pre-molded and the thermoplastic material is separately molded on the body.

30. The method of claim 29, wherein the body is molded from polyacetal material.

31. The method of claim 29, wherein the thermoplastic material is rubber.

32. The method of claim 29, wherein the thermoplastic material is polyurethane.

33. The method of claim 28, wherein providing the body includes forming a plurality of the cavities and forming a plurality of the ribs and wherein molding thermoplastic material is performed such that the thermoplastic material extends into all of the cavities and extends about all of the ribs to retain the thermoplastic material on the body.

34. The method of claim 33, wherein the body is pre-molded and the thermoplastic material is separately molded on the body.

35. The method of claim 34, wherein the body is molded from polyacetal material.

36. The method of claim 34, wherein the thermoplastic material is rubber.

37. The method of claim 34, wherein the thermoplastic material is polyurethane.

38. A method for making a belt module for use in a modular conveyor belt comprising:
   a) providing a body having an outer side surface and an oppositely disposed inner side surface, link ends on opposite ends of the body, at least one cavity extending from an opening in the outer surface towards the inner surface, and at least one rib on the body and extending in a direction across the cavity in a manner leaving portions of the opening and the cavity unobstructed adjacent opposite surfaces of the rib; and
   b) molding thermoplastic material on the body so that the material provides a frictional article transporting surface on the outer surface of the body and so that the material extends into the cavity and extends about the rib to retain the material on the body;
   wherein providing the body and molding thermoplastic material are performed by co-molding.

39. The method of claim 38, wherein the body is molded from polyacetal material.

40. The method of claim 38, wherein the thermoplastic material is rubber.

41. The method of claim 38, wherein the thermoplastic material is polyurethane.

42. A method for making a belt module for use in a modular conveyor belt comprising:
   a) providing a body having an outer side surface and an oppositely disposed inner side surface link ends on opposite ends of the body, at least one cavity extending from an opening in the outer surface towards the inner surface, and at least one rib on the body and extending in a direction across the cavity in a manner leaving portions of the opening and the cavity unobstructed adjacent opposite surfaces of the rib; and
   b) molding thermoplastic material on the body so that the material provides a frictional article transporting surface on the outer surface of the body and so that the material extends into the cavity and extends about the rib to retain the material on the body;
   wherein providing the body includes forming a plurality of the cavities and forming a plurality of the ribs and wherein molding thermoplastic material is performed such that the thermoplastic material extends into all of the cavities and extends about all of the ribs to retain the thermoplastic material on the body; and
   wherein providing the body and molding thermoplastic material are performed by co-molding.

43. The method of claim 42, wherein the body is molded from polyacetal material.

44. The method of claim 42, wherein the thermoplastic material is rubber.

45. The method of claim 42, wherein the thermoplastic material is polyurethane.

* * * * *